United States Patent [19]

Naka et al.

[11] 4,105,599

[45] Aug. 8, 1978

[54] PROCESS FOR PRODUCING RIGID POLYURETHANE FOAM

[75] Inventors: Reishi Naka; Toshikazu Narahara, both of Hitachi, Japan

[73] Assignee: Hitachi, Ltd., Japan

[21] Appl. No.: 654,914

[22] Filed: Feb. 3, 1976

[30] Foreign Application Priority Data

Feb. 21, 1975 [JP] Japan .................................. 50-20987

[51] Int. Cl.$^2$ ....................... C08G 18/14; C08G 18/50
[52] U.S. Cl. ..................................... 521/131; 521/167
[58] Field of Search ................... 260/2.5 AQ, 2.5 AS, 260/2.5 AF

[56] References Cited

U.S. PATENT DOCUMENTS

| | | | |
|---|---|---|---|
| 3,314,902 | 4/1967 | Wismer | 260/2.5 AQ |
| 3,424,700 | 1/1969 | Booth | 260/2.5 AS |
| 3,471,416 | 10/1969 | Fijal | 260/2.5 AQ |
| 3,640,997 | 2/1972 | Fijal | 260/2.5 AQ |
| 3,746,666 | 7/1973 | Neal | 260/2.5 AQ |
| 3,763,111 | 10/1973 | Fijal | 260/77.5 AQ |

*Primary Examiner*—C. Warren Ivy
*Attorney, Agent, or Firm*—Craig & Antonelli

[57] ABSTRACT

A process for producing a rigid polyurethane foam according to one-shot method which comprises reacting a polyol component with a polyfunctional isocyanate component in the presence of a polymerization catalyst, a foam stabilizer and a foaming agent, characterized in that said polyol component consists of 35 to 65 parts by weight of a sucrose polyether and 65 to 35 parts by weight of a polyoxyalkylene glycol of trihydroxyalkylamine and has an OH number of 420 to 530. According to this process, a rigid polyurethane foam having a very low density, low friability and excellent dimensional stability at low temperatures can be obtained.

8 Claims, No Drawings

PROCESS FOR PRODUCING RIGID POLYURETHANE FOAM

The present invention relates to a process for producing a rigid polyurethane foam which is usable as a heat insulating material. More particularly, the invention pertains to a process for producing a rigid polyurethane foam using a novel polyol component.

Rigid polyurethane foams are now used widely as a heat insulating material for keeping warmth or cold, and, for example, as a heat insulating material for a refrigerator. In the refrigerator, the thickness of its heat insulating layer is preferably reduced to increase its inside volume. Therefore, higher heat insulating property is required for rigid polyurethane foams used as a heating insulating material, and a low density of 0.025 g/cm³ or less is also required. When the density of rigid polyurethane foams is reduced to 0.025 g/cm³ or less, however, their friability and dimensional stability at low temperatures are remarkably deteriorated. Therefore, rigid polyurethane foams having such a low density are hardly put to practical use.

An object of the present invention is to provide a rigid polyurethane foam which has a high expansion ratio, that is, has a very low density, low friability and excellent dimensional stability at low temperatures.

According to the present invention, there is provided a process for producing a rigid polyurethane foam according to one-shot method which comprises reacting a polyol component with a polyfunctional isocyanate component, characterized in that said polyol component consists of 35 to 65 parts by weight of a sucrose polyether and 65 to 35 parts by weight of a polyoxyalkylene glycol of trihydroxyalkylamine and has an OH number of 420 to 530.

By the process of the present invention wherein the above-mentioned novel polyol component is used together with the polyoxyalkylene glycol of trihydroxyalkylamine, the desired object can be attained. Thus, a rigid polyurethane foam having a density of 0.025 g/cm³ or less can be obtained without impairing its friability characteristics and dimensional stability at low temperatures. Therefore, the object of the present invention can not be attained by the use of a sucrose polyether alone or a combination of the sucrose polyether with another known polyol such as a diol, triol or tetraol as said polyol component.

The aforesaid polyoxyalkylene glycol of trihydroxyalkylamine is represented by the formula

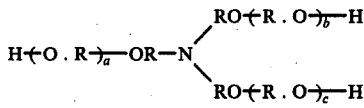

wherein R is an alkylene group such as methylene, ethylene, propylene or butylene, and $a$, $b$ and $c$ each are a number of 1 to 3 and $a + b + c$ is 3 to 5. Here, OH number is 420 if $a + b + c$ is 3 while OH number is 530 if $a + b + c$ is 5.

The reason why the blending ratio of the sucrose polyether to the polyalkylene glycol of trihydroxyalkylamine must be 35–65 parts by weight of the former to 65–35 parts by weight of the latter is that friability can not be reduced satisfactorily if the blending ratio is smaller than the above-mentioned range and that an improvement in dimensional stability at low temperatures can not be expected if the blending ratio is larger than the abovementioned range. Also, the reason why the OH number must be 420 to 530 is that dimensional stability becomes unsatifactory if the OH number is less than 420 and that friability increases if the blending ratio is more than 530.

The sucrose polyethers which may be used are well known and can be obtained by, for example, the addition reaction of a polyoxyalkylene oxide to sugar. On the one hand, said polyoxyalkylene glycols of trihydroxyalkylamines can be produced by the addition reaction of a known polyoxyalkylene oxide such as polyoxymethylene oxide, polyoxyethylene oxide, polyoxypropylene oxide or polyoxybutylene oxide to a trihydroxyalkylamine such as trimethanolamine, triethanolamine or tripropanolamine, and are generally known as a surfactant. Any of these polyoxyalkylene glycols of trihydroxyalkylamines may be used in the present invention. At least one each of the sucrose polyethers and the polyoxyalkylene glycols of trihydroxyalkylamines is used.

As the polyfunctional isocyanate component, any of known polyfunctional isocyanates such as diphenylmethane-4,4'-diisocyanate, xylylene diisocyanates, polymethylenepolyphenylisocyanates, 3,3'-dimethyldiphenylmethane-4,4'-diisocyanate, 2,4-tolylenediisocyanate dimer, m-phenylenediisocyanate or tolylene diisocyanates may be used. At least one of these isocyanates is used.

In the present invention, a blending ratio of a polyol component to a polyfunctional isocyanate component is not critical, but may be selected according to the blending ratio used in prior art processes for the production of rigid polyurethane foams. In general, however, a molar ratio of NCO/OH is about 1.05.

Also, any conventional catalyst, foam stabilizer and foaming agent can be used in the present invention. The catalyst is exemplified by tertiary amines such as dimethylaminoethanol or triethylenediamine and organotin compounds such as dibutyl tin diacetate or dibutyl tin dilaurate. As a foam stabilizer, for example, organosilicon block copolymers represented by the formula

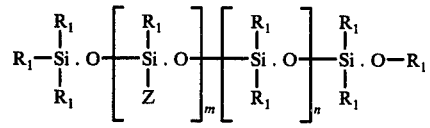

wherein Z is $-(CH_2)_l-(OC_2H_4)_q-OR_2$ or $-(CH_2)_l-(OC_2H_4)_x-(OC_3H_6)_y-OR_2$, $R_1$ is methyl or ethyl, $m/n$ is 0.2 to 1 and $m + n$ is 17 to 28, $l$ is 1 to 4, $q$ is 15 to 60, $x/y$ is 1 to 9 and $x + y$ is 15 to 60, and $R_2$ is an alkyl having 1 to 4 carbon atoms, and having a mean molecular weight of 10,000 to 20,000 are useful.

As the foaming agent, volatile compounds such as lower fluorochlorinated hydrocarbons, for example, $CCl_3F$ (Freon R-11), $CCl_2F_2$ (Freon R-12) and $CCl_2F-CClF_2$ (Freon R-113), formaldehyde generating agents such as bis(hydroxymethyl)thiourea, nitrogen gas generating agents such as diazoaminobenzene, and $CO_2$ generating agents such as water may be used.

In the present invention, the amount of the catalyst used can be selected according to that in prior art processes. In general, the amount of the catalyst used may be selected so that cream time may be 5 to 20 seconds, and preferably 8 to 15 seconds, and tack-free time may be 20 to 200 seconds, and preferably 30 to 80 seconds. The amount of the foaming agent used should be selected suitably according to the specific gravity of the desired foam. The amount of the foam stabilizer used may also be freely selected according to prior art processes.

The present inventors have found that a foaming pressure is increased and a foam having excellent dimensional stability at low temperatures can be obtained when a small amount of water is used as a foaming agent together with said volatile compound. In the case of flexible polyurethane foams, there are examples wherein water was used as a foaming agent. In the case of rigid polyurethane foams, however, there are very few examples wherein water was used as a foaming agent since a remarkable increase in friability is brought about. Therefore, it is quite surprising that deterioration in physical properties is small even if water is used as a foaming agent in the present invention. This fact is considered to be caused by the synergistic effect of the use of water together with said novel polyol component. When water is used together with said volatile compound, the amount of water used should be 0.2 to 3 parts by weight, and preferably 0.5 to 2 parts by weight per 100 parts by weight of said polyol component. If the amount of water is more than 3 parts by weight, not only the amount of the polyfunctional isocyanate component consumed disadvantageously increases but also the friability of the resulting foam is remarkably increased and its heating insulating property is also deteriorated. When water is used together with said volatile compound and the wall temperature (interface temperature) on foaming is less than 45° C, and preferably less than 30° C, it is preferable that a combination of such a polyfunctional isocyanate compound as the distance between two —NCO groups is comparatively long and the cross-linking density of the resulting foam is low, for example, diphenylmethane-4,4'-diisocyanate, and such a polyfunctional isocyanate compound as the distance between two —NCO groups is short and the cross-linking density of the foam can be increased, for example, a tolylene diisocyanate is used as said polyfunctional isocyanate component. In this case, a blending ratio of the former to the latter should be 30 to 70% by weight to 70 to 30% by weight, and preferably 40 to 60% by weight to 60 to 40% by weight. If the amount of the latter is less than 30% by weight, dimensional stability at low temperatures becomes poor. Also, if the amount of the latter is more than 70% by weight, friability tends to increase. The former polyfunctional isocyanate compound which can give a low cross-linking density is exemplified by diphenylmethane-4,4'-diisocyanate, xylylene diisocyanates, polymethylenepolyphenylisocyanates, 3,3'-dimethyldiphenylmethane-4,4'-diisocyanate, 2,4'-tolylenediisocyanate dimer and m-phenylenediisocynate. Also, the latter polyfunctional disocyanate compound which can give a high cross-linking density is exemplified by tolylene diisocyanates.

In the present invention, diols such as polyoxypropylene glycol, polyoxypropylene-polyoxyethylene glycol and triols such as polyoxyalkylene glycols of trimethylolpropane, glycerol and hexanetriol may be added to the reaction mixture in order to control the viscosity (fluidity) of the reaction mixture. In this case, the amount of the diols or triols used should be 15% by weight or less for the diols and 30% by weight for the triols based on the total weight of the whole polyol components. If the amount used exceeds these values, there is a danger that dimensional stability at low temperatures becomes poor.

The following examples illustrate the present invention in more detail referring to the following comparative examples and the following referential examples. However, the present invention is not limited to these examples. For example, the kinds and amount used of the polyol component, the polyfunctional isocyanate component, the catalyst, the foam stabilizer, the foaming agent and the other additives can be freely varied. Also, the method for preparing the starting liquid for the foam and foaming conditions such as a wall temperature (interface temperature) can be freely changed. In the examples, comparative examples and referential examples, all parts and % are expressed by weight unless otherwise indicated.

Comparative Examples 1 – 8

As a polyol component, 65 parts of a sucrose polyether of an OH number of 523 obtained by the addition reaction of polyoxypropylene oxide to sugar, 35 parts of a polyfunctional polyol (A) of an OH number of 490 obtained by the addition reaction of polyoxypropylene oxide to the starters of polyether as shown in Table 1, and 7 parts of dipropylene glycol were used. As a polyfunctional isocyanate component, a crude tolylene diisocyanate (NCO content 39 to 40%) was used. A blending ratio of the polyol component to the polyfunctional isocyanate component was NCO/OH = 1.05. Also, 3 parts of a 33% dipropylene glycol solution of triethylenediamine as a catalyst, 2 parts of a polysiloxane-polyoxyalkylene glycol block copolymer (viscosity 700 centistokes at 25° C, specific gravity 1.048, freezing point below −5° C) as a foam stabilizer, and the amounts as shown in Table 1 of a combination of a lower fluorochlorinated hydrocarbon (trichlorofluoromethane, Freon R-11) and water as a foaming agent were used.

These components were mixed and then foamed at a wall temperature of 45° C. In this case, cream time was 8 to 10 seconds and tack-free time was 60 to 70 seconds. Foaming was carried out by using a free rise aluminum box (inner dimension 250 mm × 250 mm × 250 mm) having a thickness of 10 mm. The wall tempeature (interface temperature) means the temperature of the wall of said aluminum box on foaming. When the box is made of a material having a high thermal conductivity such as aluminum, the wall temperature has a great influence on the quality of the resulting foam. If the wall temperature is too low, a foam of a good quality cannot be obtained.

EXAMPLES 1 – 2

As a polyol component, 65 parts of a sucrose polyether of an OH number of 523 obtained by the addition reaction of 1 mole of polyoxypropylene oxide to 1 mole of sugar, 35 parts of a polyether of an OH number of 480 to 510 obtained by the addition reaction of 3 to 4 moles of polyoxypropylene oxide to 1 mole of triethanolamine, and 7 parts of dipropylene glycol were used. As a polyfunctional isocyanate component, a crude tolylene diisocyanate (NCO content 39 to 40%) was used. A blending ratio of the polyol component to the polyfunctional isocyanate component was NCO/OH = 1.05. Also, 3 parts of a 33% dipropylene glycol solution of triethylenediamine as a catalyst, 2 parts of a polysiloxane-polyoxyalkylene glycol block copolymer of said formula wherein $R_2$ is $CH_3$ (viscosity 700 centistokes, specific gravity 1,048, freezing point below −5° C) as a foam stabilizer, and the amounts as shown in Table 1 of a combination of a lower fluorochlorinated hydrocarbon (trichlorofluoromethane, Freon R-11) and water as a foaming agent were used. These components were mixed and then foamed at a wall temperature of 45° C. In this case, cream time was 8 to 10 seconds and tack-free time was 60 to 70 seconds.

Table 1

| Sample | Starter of polyether | Amount of foaming agent Freon R-11 (parts) | Water (parts) | Density (g/cm³) | Dimensional* stability at low temperatures (%) | Friability** (%) |
|---|---|---|---|---|---|---|
| Comparative | | | | | | |
| Example 1 | Glycerol | 30 | 1.5 | 0.0232 | −8 | 14 |
| Example 2 | " | 34 | 1.5 | 0.0213 | −21 | 23 |
| Example 3 | Trimethylol-propane | 30 | 1.5 | 0.0234 | −12 | 16 |
| Example 4 | " | 34 | 1.5 | 0.0210 | −28 | 28 |
| Example 5 | Propylene glycol | 30 | 1.5 | 0.0230 | −15 | 22 |
| Example 6 | " | 34 | 1.5 | 0.0212 | −38 | 32 |
| Example 7 | Ethylene diamine | 30 | 1.5 | 0.0230 | −8 | 14 |
| Example 8 | " | 34 | 1.5 | 0.0210 | −26 | 19 |
| Example 1 | — | 30 | 1.5 | 0.0234 | −0.5 | 14 |
| Example 2 | — | 34 | 1.5 | 0.0213 | −0.5 | 15 |

*Dimensional stability at low temperatures is volume change after standing at −20° C for 48 hours.
**According to ASTM-C 421-61.

Table 1 shows that an improvement in dimensional stability at low temperatures and a decrease in friability can be accomplished in Examples 1 and 2 using a novel polyol component consisting of a sucrose polyether and a polyoxyalkylene glycol of trihydroxyalkylamine.

The effective OH number of the polyol component was examined. The results obtained are shown in the following Referential Examples 1 − 2 and Examples 3 − 12.

Referential Examples 1 − 2 Examples 3 − 12

Rigid polyurethane foams were produced in the same manner as in the previous examples except that a combination of 65 parts of sucrose polyethers each having the OH values as shown in Table 2 (referred to as "S" in Table 2) and 35 parts of polyoxypropylene glycol of triethanolamine (referred to as "T" in Table 2) was used as the polyol component. The results obtained are shown in Table 2.

Table 2

| Sample | OH number of each polyol S | T | Density (g/cm³) | Dimensional stability at low temperatures (%) | Friability (%) |
|---|---|---|---|---|---|
| Referential | | | | | |
| Example 1 | 550 | 530 | 0.0218 | −0.2 | 36 |
| Example 3 | 530 | 490 | 0.0216 | −0.3 | 28 |
| Example 4 | 510 | 490 | 0.0212 | −0.3 | 21 |
| Example 5 | 490 | 490 | 0.0210 | −0.8 | 21 |
| Example 6 | 450 | 490 | 0.0210 | −6.8 | 20 |
| Example 7 | 430 | 490 | 0.0210 | −12.0 | 20 |
| Example 8 | 400 | 490 | 0.0211 | −22.2 | 18 |
| Example 9 | 510 | 548 | 0.0209 | −0.8 | 24 |
| Example 10 | 510 | 530 | 0.0210 | −0.8 | 21 |
| Example 11 | 510 | 460 | 0.0210 | −11 | 19 |
| Example 12 | 430 | 440 | 0.0212 | −30 | 18 |
| Referential | | | | | |
| Example 2 | 380 | 440 | 0.0210 | −55 | 18 |

Table 2 shows that a preferable OH number is 420 to 530 for any polyol. However, friability was slightly high. As a result of various studies, it has been found that this defect can be obviated by using a blending ratio of 35 to 65 parts of a sucrose polyether to 65 to 35 parts of a polyoxyalkylene glycol of trihydroxyalkylamine as shown in the following examples and referential examples.

Examples 13 − 17 and Referential Examples 3 − 4

Rigid polyurethane foams were produced in the same manner as in the previous examples except that a sucrose polyether having an OH number of 510 (referred to as "S" in Table 3) and polyoxypropylene glycol of triethanolamine having an OH number of 490 (referred to as "T" in Table 3) were used as the polyol component. The results obtained are shown in Table 3.

Table 3

| Sample | Amount of each polyol blended S (parts) | T (parts) | Density (g/cm³) | Dimensional stability at low temperatures (%) | Friability (%) |
|---|---|---|---|---|---|
| Referential | | | | | |
| Example 3 | 70 | 30 | 0.0216 | −1.8 | 42 |
| Example 13 | 65 | 35 | 0.0210 | −0.8 | 21 |
| Example 14 | 60 | 40 | 0.0215 | −0.5 | 19 |
| Example 15 | 50 | 50 | 0.0209 | −0.5 | 17 |
| Example 16 | 40 | 60 | 0.0212 | −0.5 | 15 |
| Example 17 | 35 | 65 | 0.0216 | −8 | 14 |
| Referential | | | | | |
| Example 4 | 30 | 70 | 0.0210 | −39 | 14 |

The following examples illustrate various embodiments of the present invention.

Examples 18 − 41

Rigid polyurethane foams were produced by mixing 40 parts of a sucrose polyether having an OH number of 510 and 60 parts of polyoxypropylene glycol of triethanolamine having an OH number of 490 as a polyol component, crude tolylene diisocyanate (NCO content 39 − 40%, referred to as "C-TDI" in Table 4) and crude diphenylmethane-4,4'-diisocyanate (NCO content 30 − 32%, referred to as "C-MDI" in Table 4) as a polyfunctional isocyanate component, a foaming agent, 1 part of triethylenediamine (as a 33% dipropylene glycol solution) and 2 parts of dibutyl tin dilaurate as catalysts, and 2 parts of the foam stabilizer as used in the previous examples and then foaming the mixture. In this case, 35 parts of Freon R-11 (CCl₃F) and the amounts as shown in Table 4 of water were used as the foaming agent. Also, the interface temperature on foaming is as shown in Table 4. The properties of the foams thus obtained are shown in Table 5.

Table 4

| Sample | Polyfunctional isocyanate (%) C-TDI | Polyfunctional isocyanate (%) C-MDI | Water (parts) | Interface temperature (° C) |
|---|---|---|---|---|
| Example 18 | 100 | — | 0 | 45 – 50 |
| Example 19 | 100 | — | 1 | " |
| Example 20 | 100 | — | 2 | " |
| Example 21 | 100 | — | 2.5 | " |
| Example 22 | 100 | — | 0 | 30 – 35 |
| Example 23 | 100 | — | 1 | " |
| Example 24 | 100 | — | 2 | " |
| Example 25 | 100 | — | 2.5 | " |
| Example 26 | — | 100 | 0 | 45 – 50 |
| Example 27 | — | 100 | 1 | " |
| Example 28 | — | 100 | 2 | " |
| Example 29 | — | 100 | 2.5 | " |
| Example 30 | — | 100 | 0 | 30 – 35 |
| Example 31 | — | 100 | 1 | " |
| Example 32 | — | 100 | 2 | " |
| Example 33 | — | 100 | 2.5 | " |
| Example 34 | 50 | 50 | 0 | 45 – 50 |
| Example 35 | " | " | 1 | " |
| Example 36 | " | " | 2 | " |
| Example 37 | " | " | 2.5 | " |
| Example 38 | " | " | 0 | 30 – 35 |
| Example 39 | " | " | 1 | " |
| Example 40 | " | " | 2 | " |
| Example 41 | " | " | 2.5 | " |

Table 5

| Sample | Density (g/cm³) | Dimensional stability at low temperatures (%) | Friability (%) |
|---|---|---|---|
| Example 18 | 0.0275 | 0 | 13 |
| Example 19 | 0.0252 | 0 | 14 |
| Example 20 | 0.0210 | 0 | 16 |
| Example 21 | 0.0190 | −0.8 | 18 |
| Example 22 | 0.0272 | 0 | 18 |
| Example 23 | 0.0251 | 0 | 22 |
| Example 24 | 0.0208 | 0 | 28 |
| Example 25 | 0.0191 | −1.0 | 32 |
| Example 26 | 0.0263 | 0 | 14 |
| Example 27 | 0.0248 | 0 | 15 |
| Example 28 | 0.0206 | −4.8 | 15 |
| Example 29 | 0.0188 | −8.6 | 16 |
| Example 30 | 0.0267 | 0 | 14 |
| Example 31 | 0.0246 | 0 | 15 |
| Example 32 | 0.0203 | −5.2 | 15 |
| Example 33 | 0.0187 | −10.2 | 16 |
| Example 34 | 0.0270 | 0 | 13 |
| Example 35 | 0.0250 | 0 | 14 |
| Example 36 | 0.0208 | −1.8 | 16 |
| Example 37 | 0.0190 | −2.2 | 16 |
| Example 38 | 0.0271 | 0 | 15 |
| Example 39 | 0.0249 | 0 | 16 |
| Example 40 | 0.0204 | −2.0 | 17 |
| Example 41 | 0.0189 | −2.8 | 17 |

Examples 42 – 47

Rigid polyurethane foams were produced in the same manner as in Example 36 except that the amounts as shown in Table 6 of a 33% dipropylene glycol solution of triethylenediamine or a dibutyl tin compound alone were used as a catalyst. The results obtained are shown in Table 6.

Table 6

| Sample | Catalyst (parts) 33% Solution of triethylenediamine in dipropylene glycol | Catalyst (parts) Dibutyl tin compound | Density (g/cm³) | Dimensional stability at low temperatures (%) | Friability (%) |
|---|---|---|---|---|---|
| Example 42 | 1.0 | — | 0.0192 | −2.0 | 18 |
| Example 43 | 1.5 | — | 0.0193 | −2.4 | 17 |
| Example 44 | 2.0 | — | 0.0195 | −2.6 | 17 |
| Example 45 | — | 0.1 | 0.0195 | −2.6 | 17 |
| Example 46 | — | 0.2 | 0.0197 | −2.9 | 16 |
| Example 47 | — | 0.3 | 0.0198 | −3.1 | 16 |

What is claimed is:

1. A process for producing a rigid polyurethane foam according to one-shot method which comprises reacting a polyol with a polyfunctional organic isocyanate, said polyol having a mixture having an OH number of 420 to 530 which comprises 35 to 65 parts by weight of a reaction product of sucrose with an alkylene oxide and 65 to 35 parts by weight of a reaction product of a trihydroxyalkylamine with an alkylene oxide, and said mixture being free from a phosphorus-containing polyol, in the presence of at least two foaming agents consisting of at least one fluorochlorinated hydrocarbon having 1 to 2 carbon atoms and 0.2 to 2 parts by weight of water per 100 parts by weight of said polyol to form a rigid polyurethane foam having a density of 0.025 gm/cm³ or less.

2. A process according to claim 1, wherein the mixture of said polyol comprises 40 parts by weight of the reaction product of sucrose with the alkylene oxide and 60 parts by weight of the reaction product of the trihydroxyalkylamine with the alkylene oxide.

3. A process according to claim 1, wherein said reaction product of the trihydroxyalkylamine with the alkylene oxide is represented by the formula

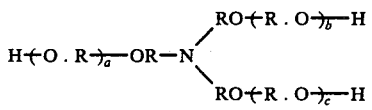

wherein R is an alkylene group and a, b and c each are a number of 1 to 3 and a + b + c is 3 to 5.

4. A process according to claim 1, wherein at least two polyfunctional organic isocyanates consisting of 30 to 70% by weight of at least one crude or purified polyfunctional isocyanate selected from the group consisting of diphenylmethane-4,4'-diisocyanate, $a$ xylylene diisocyanate and a polymethylenepolyphenylisocyanate and 70 to 30% by weight of a crude or purified tolylene diisocyanate are used as said polyfunctional organic isocyanate.

5. A process according to claim 1, wherein 0.26 to 1.3 parts by weight of at least triethylenediamine per 100 parts by weight of said reaction product of the trihydroxyalkylamine with the alkylene oxide is used as a catalyst.

6. A process according to claim 1, wherein an organosilicon block copolymer represented by the formula

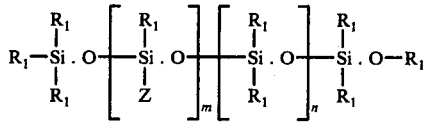

wherein Z is $(CH_2)_l (OC_2H_4)_q OR_2$ or $(CH_2)_l (OC_2H_4)_x (OC_3H_6)_y OR_2$, $R_1$ is methyl or ethyl, $m/n$ is 0.2 to 1 and $m + n$ is 17 to 28, $l$ is 1 to 4, $q$ is 15 to 60, $x/y$ is 1 to 9 and $x + y$ is 15 to 60, and $R_2$ is an alkyl having 1 to 4 carbon atoms, and having a mean molecular weight of 10,000 to 20,000 is used as a foam stabilizer.

7. A process according to claim 1, wherein 0.08 to 0.8 part by weight of at least one organometal compound per 100 parts by weight of said reaction product of the trihydroxyalkylamine with the alkylene oxide is used as a catalyst.

8. A process according to claim 1, wherein said polyol has an OH number of 480 to 510.

* * * * *